United States Patent [19]

Fukuda et al.

[11] 4,446,272

[45] May 1, 1984

[54] RESIN COMPOSITION HAVING NICE COLOR TONE AND HIGH CRACK-RESISTANCE

[75] Inventors: Kunio Fukuda; Kichiya Tazaki; Akihisa Takano; Yuji Kusumi, all of Kanagawa, Japan

[73] Assignee: Asahi-Dow Limited, Tokyo, Japan

[21] Appl. No.: 300,748

[22] Filed: Sep. 10, 1981

Related U.S. Application Data

[63] Continuation-in-part of Ser. No. 110,752, Jan. 8, 1980, abandoned.

[30] Foreign Application Priority Data

Jan. 22, 1979 [JP] Japan .................................. 54-4741

[51] Int. Cl.³ ........................ C08K 5/03; C08L 71/04
[52] U.S. Cl. .................... 524/465; 524/341; 524/371; 524/469; 524/470; 524/471; 525/68; 525/132; 525/392
[58] Field of Search ................ 260/45.7 RL; 525/63, 525/68, 132, 152; 526/348; 524/465, 469, 470, 471

[56] References Cited

U.S. PATENT DOCUMENTS

| | | |
|---|---|---|
| 3,328,366 | 6/1967 | Nakaguchi et al. ................. 526/348 |
| 3,361,851 | 1/1968 | Gowan ................................ 525/132 |
| 3,639,506 | 2/1972 | Haaf ................................ 260/45.7 P |
| 3,809,729 | 5/1974 | Reinhard ............................ 524/469 |
| 3,920,770 | 11/1975 | Nakashio et al. ................... 525/152 |
| 3,929,931 | 12/1975 | Izawa et al. ........................ 525/63 |
| 3,943,191 | 3/1976 | Cooper et al. ....................... 525/68 |
| 3,959,211 | 5/1976 | Cooper et al. ................. 260/45.7 P |
| 3,974,235 | 8/1976 | Cooper et al. ................. 260/45.7 P |
| 4,128,602 | 12/1978 | Katchman et al. ................... 525/68 |
| 4,203,931 | 5/1980 | Lee, Jr. ........................... 260/3.4 R |
| 4,219,466 | 8/1980 | Yoshida et al. ............. 260/45.7 RL |
| 4,299,757 | 11/1981 | Kuribayashi et al. ................. 525/68 |
| 4,309,513 | 1/1982 | Ueno et al. ........................... 525/68 |
| 4,332,714 | 6/1982 | Haaf et al. .......................... 525/68 |
| 4,373,045 | 2/1983 | Cooper et al. ....................... 525/68 |

FOREIGN PATENT DOCUMENTS 2713437 10/1977 Fed. Rep. of Germany .

Primary Examiner—John Kight, III
Assistant Examiner—R. A. White
Attorney, Agent, or Firm—Cushman, Darby & Cushman

[57] ABSTRACT

A resin composition having nice color tone and high crack-resistance as well as flame-retardancy is obtained by blending (A) 100 weight parts of a resin composition containing a rubber-reinforced vinyl aromatic polymer and polyphenylene ether represented by the following general formula:

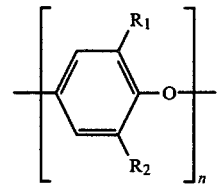

wherein each of $R_1$ and $R_2$ represents a monovalent residue such as the same or different alkyl group having 1–4 carbon atoms, aryl group, halogen and hydrogen, and n represents the polymerization degree or a polyphenylene ether onto which a vinyl aromatic compound is graft-copolymerized, in which the polyphenylene ether content is 5–70 wt. % (based on the weight of the resin part), (B) 1–30 weight parts of a halogenated aromatic compound and (C) 0.5–20 weight parts of a non-crystalline ethylene-propylene copolymer.

6 Claims, No Drawings

RESIN COMPOSITION HAVING NICE COLOR TONE AND HIGH CRACK-RESISTANCE

This application is a continuation-in-part of application, Ser. No. 110,752, filed Jan. 8, 1980 and now abandoned.

The present invention relates to a polyphenylene ether resin composition having nice color tone and high crack-resistance. More particularly, the present invention relates to a resin composition prepared by essentially blending a halogenated aromatic compound and a non-crystalline ethylene-propylene copolymer with a resin composition containing a rubber-reinforced vinyl aromatic polymer and a polyphenylene ether or a polyphenylene ether onto which a vinyl aromatic compound is graft-copolymerized.

Polyphenylene ether is a resin which recently attracts much attention because it is excellent in mechanical properties, electrical characteristics, chemical resistance, heat resistance, etc. and, in addition, it has low water absorption and high dimensional stability. However, the poor processability of polyphenylene ether has been earlier pointed out and it is the largest defect. As the method to improve it, there have been known many methods wherein a vinyl aromatic compound is added. For instance, blend compositions of polyphenylene ether and vinyl aromatic polymers are disclosed in Japanese published examined patent application No. 17812/1968 and U.S. Pat. No. 3,383,435, etc. Also there are disclosed resin compositions comprising graft-copolymers prepared by the graft-copolymerization of vinyl aromatic compound onto polyphenylene ether in Japanese published examined patent applications No. 1210/1972 and Ser. No. 27809/1971, Japanese published unexamined patent applications No. 98446/1974 and No. 51150/1975 and U.S. Pat. Nos. 3,586,736 and 3,929,931, etc. Particularly, compositions comprising rubber-reinforced vinyl aromatic polymers and polyphenylene ethers have improved toughness as well as processability. Accordingly, various technologies on rubber-reinforcement are disclosed as seen in the U.S. Pat. Nos. 3,660,531, 4,128,602 and 3,943,191.

On the one hand, polyphenylene ethers themselves are colored in brown and the resin compositions comprising them and vinyl aromatic polymers show poor coloring property, which is a defect pointed out earlier. Particularly, when it is colored in white, titanium dioxide is usually added thereto; however, pure white color cannot be obtained even when a considerably large amount of the titanium dioxide is added thereto. Rather there is seen a defect that the mechanical properties are lowered owing to the effect of titanium dioxide added and the improvement in this point has been eagerly desired in practice. Although compositions comprising a polyphenylene ether and a rubber-reinforced vinyl aromatic resin have been used industrially, an improvement in crack-resistance in addition to processability and impact-resistance has been highly desired for wider uses thereof.

The possibility to attach a number of parts to a plastic molded product, for instance, electrical parts can be directly attached to a plastic housing without particular use of a chassis and the like causes much savings in raw material and man-hour, which is a large merit in industries and a large element of reasons why plastics have been widely used. For the attachment of these parts, a method wherein, utilizing the moldability and shaping capability of plastics, a so-called boss part is set up and the part is directly screwed in with a metal screw (self-tapping method) or a method wherein metal insert is used is well known by the skilled in the art. In these methods, in the case of self-tap or metal insert, there often cause accidents due to breakdown at the boss part of the self-tap or the plastic part around the insert when the product is used or assembled or while it is reserved after molding. Accordingly, it is highly desired to obtain better crack-resistance.

Furthermore, a polyphenylene ether has excellent flame-retardancy and it is rated as the self-extinguishing and non-dripping according to the standard No. 94 of Underwriters Laboratories (hereinafter referred to as UL-94) which is widely used as a practical standard. However, the composition comprising the polyphenylene ether and a rubber-reinforced vinyl aromatic polymer completely burns out when ignited. Consequently, the composition is not a suitable material in a wide scope of industrial use because of the inflammability.

The present inventors have studied to resolve the problems above to which the improvement was highly desired in practical uses. As a result, they found a polyphenylene ether composition excellent in color tone and crack-resistance and in high flame-retardancy.

According to the present invention, a resin composition is provided, which essentially comprising (A) 100 weight parts of a resin composition prepared by blending a rubber-reinforced vinyl aromatic polymer with a polyphenylene ether represented by the following general formula:

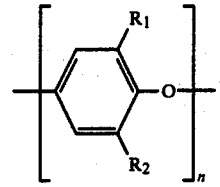

wherein each of $R_1$ and $R_2$ represents the same or different monovalent residue such as alkyl group having 1–4 carbon atoms, aryl group, halogen and hydrogen and n represents the polymerization degree (about 50 to about 250) or a polyphenylene ether onto which a vinyl aromatic compound is graft-copolymerized, so that the polyphenylene ether content is 5–70 wt. % (based on the weight of the resin part), (B) 1–30 weight parts of a halogenated aromatic compound and (C) 0.5–20 weight parts of a non-crystalline ethylene-propylene copolymer.

The polyphenylene ether resin mentioned in the present invention means a polymer represented by the following general formula:

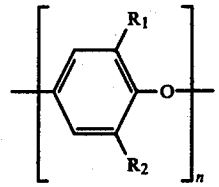

wherein each of $R_1$ and $R_2$ represents a monovalent residual group such as the same or different alkyl group, aryl group, halogen or hydrogen and n represents the polymerization degree. It is well known that, for instance, such a polymer can be obtained by the reaction of raw material phenol with oxygen in the presence of a complex of copper or of manganese. As concrete examples there can be illustrated poly(2,6-dimethyl-1,4-phenylene)ether, poly(2,6-diethyl-1,4-phenylene)ether, poly(2,6-dichloro-1,4-phenylene)ether, poly(2,6-dibromo-1,4-phenylene)ether, poly(2-methyl-6-ethyl-1,4-phenylene)ether, poly(2-chloro-6-methyl-1,4-phenylene)ether, poly(2-methyl-6-isopropyl-1,4-phenylene)ether, poly(2,6-di-n-propyl-1,4-phenylene)ether, poly(2-chloro-6-bromo-1,4-phenylene)ether, poly(2-chloro-6-ethyl-1,4-phenylene)ether, poly(2-methyl-1,4-phenylene)ether, poly(2-chloro-1,4-phenylene)ether, poly(2-phenyl-1,4-phenylene)ether, poly(2-methyl-6-phenyl-1,4-phenylene)ether, poly(2-bromo-6-phenyl-1,4-phenylene)ether and the like.

Other than those mentioned above, there may be used a polymer prepared by the graft-copolymerization of styrene, typically, alone or a monomer copolymerizable with styrene onto the polyphenylene ether mentioned above.

As a monomer copolymerizable with styrene, there can be used, for example, α-methystyrene, methylstyrene, dimethylstyrene, vinyltoluene, acrylonitrile, methacrylonitrile, acrylic acid, methacrylic acid or a methacrylate.

Although there is no particular limitation on the means for the graft-copolymerization of such a monomer onto a polyphenylene ether, there can be used a method proposed in, for instance, Japanese published examined patent applications No. 30991/1977 and No. 38596/1978, Japanese published unexamined patent application No. 142799/1977, etc., that is, one wherein styrene alone or one of the monomers mentioned above is graft-copolymerized under heating onto polyphenylene ether in the presence of a peroxide.

The graftcopolymer used for the composition of the present invention is preferable one prepared by the graft-copolymerization of a vinyl aromatic compound in a range of 20-200 weight parts onto 100 weight parts of polyphenylene ether. When the content of the vinyl aromatic compound is less than 20 weight parts, the graft-copolymer produced is not much different from the polyphenylene ether homopolymer. However, when the vinyl aromatic compound exceeding 200 weight parts is graft-copolymerized, the composition is not desirable because of the decrease in physical properties, particularly in impact strength.

The rubber-reinforced vinyl aromatic resin mentioned in the present invention is a homopolymer of a vinyl aromatic monomer and/or one wherein a vinyl aromatic copolymer forms a matrix phase and a rubber-like polymer is dispersed therein like islands. It has been well known that such a rubber-reinforced vinyl aromatic resin can be prepared by such a process as bulk polymerization, solution polymerization, bulk-suspension polymerization or emulsion polymerization of a monomer which contains a vinyl aromatic compound as the main component in the presence of a rubber-like polymer and in the presence or absence of a radical polymerization initiator. Such a rubber-reinforced vinyl aromatic resin has been industrially produced. As the rubber-like polymer, there are used natural rubber, polybutadiene, butadiene-styrene copolymer rubber, butadiene-acrylonitrile copolymer rubber ethylene-propylene copolymer rubber and acryl rubber. Polybutadiene and butadiene-styrene copolymer rubber are particularly preferable among them.

As the vinyl aromatic compound, there may be used one or two or more of the compounds represented by the following general formula:

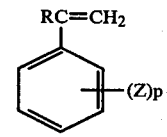

wherein R represents hydrogen, a lower alkyl group or halogen, Z represents hydrogen, a lower alkyl group, halogen or a vinyl group and P represents zero or an integer of 1–5; or there may be used together with them a vinyl compound copolymerizable with them, for example, methyl methacrylate, acrylonitrile, methacrylonitrile, butyl acrylate, maleic anhydride and the like. As a vinyl aromatic compound, so-called rubber-reinforced polystyrene wherein styrene is used as the main component is massproduced and it is a preferable compound from the viewpoint of the compatibility with a polyphenylene ether.

The ratio at which the vinyl aromatic compound accounts for in the total resin (including the part chemically bonded by the graft-copolymerization thereof onto the polyphenylene ether) is from a range of 30-95 wt. %, preferably 50-90 wt. %. When the content of the vinyl aromatic compound is lower than 30 wt. %, satisfactory processability can not be imparted to the composition; however, when it exceeds 95 wt. %, there cause undesirable phenomena such as low heat-resistance.

Though there is no particular limitation on the halogenated aromatic compound, those having high thermal stability when molding and fabricating are made are desirable. Halogenated aliphatic compounds are not preferable because of the low thermal stability. As individual compounds, there can be illustrated substituted benzenes such as dichlorobenzene and dibromobenzene, substituted biphenyls such as dibromobiphenyl, substituted biphenylethers such as decabromobiphenylether and substituted bisphenols such as tetrabromobisphenol A and derivertives thereof such as, for example, an oligomer of tetrabromobisphenol A. It is a matter of course that these halogenated aromatic compounds can be used alone or in combination of two or more. Further, there can be used flame-retardants such as antimony compounds such as antimony trioxide, boron compounds such as borax, zirconium compounds such as zirconium oxide and phosphates such as trialkyl phosphate and triallyl phosphate in combination with said halogenated aromatic compounds. Though the amount of these flame-retardants to be added varies depending upon the composition of the resin composition, the flame-retardant employed and the combination thereof, usually a range of 1-30 weight parts based on 100 weight parts of the resin composition is preferable. When the amount of the flame-retardant added is too small, the level of flame-retardancy is not sufficiently high and the effect of improvement in color tone can not be obtained. However, when the amount of the flame-retardant is too large, there causes the decrease in impact strength and heat-resistance.

As to the amount of non-crystalline ethylene-propylene copolymer to be added, it is desirable to use the same in a range of 0.5–20 weight parts based on 100 weight parts of the polyphenylene ether-vinyl aromatic resin composition. When the amount of the same is less than 0.5 weight part, almost no synergetic effect can be seen; however, the amount exceeding 20 weight parts is not desirable because particularly the mechanical properties are lowered.

There is no particular limitation on the method to obtain the composition of the present invention and the blending may be carried out according to any method. According to a desirable method, for instance, the resin to form the composition, the halogenated aromatic compound and the non-crystalline ethylene-propylene copolymer are sufficiently blended with a blender and the resultant mixture is molten and kneaded with an extruder followed by cutting of the extrudate into pellets.

It is a matter of course that the composition of the present invention may contain, if necessary, other additives such as, for example, plasticizers, pigments, reinforcing agents, fillers, extenders and stabilizers.

The present invention will be further explained with Examples hereinbelow. Part and % shown in Examples represent weight part and wt. %, respectively.

From the comparison between Examples and Comparison Examples mentioned below, it is obvious that a flame-retardant polyphenylene ether composition having nice color tone and high crack-resistance can be obtained in accordance with the present invention.

EXAMPLE 1

In a blender, there were blended 20 parts of a poly (2,6-dimethyl-1,4-phenylene)ether having a number average molecular weight of 12,500, 80 parts of a rubber-reinforced polystyrene containing 12% of polybutadiene, 12 parts of decabromobiphenylether, 4 parts of antimony trioxide and 4 parts of a non-crystalline ethylene-propylene copolymer containing 75 mol % of ethylene and 25 mol % of propylene (Melt Index=0.5 at 230° C., by ASTM D 1238). The resultant blend was then molten and kneaded with a twin-screw extruder maintained at 230° C. to 260° C. to obtain pellets. The resin composition was found to have the physical properties as shown in Table 1. When the procedure of Example 1 was repeated except that the non-crystalline ethylene-propylene copolymer employed was replaced with those having various melt index values of 0.1, 1, 5, 10 and 15, respectively, there could be obtained similar results.

COMPARISON EXAMPLE 1

The procedure of Example 1 was repeated except that the non-crystalline ethylene-propylene copolymer was omitted from the composition to give the results as shown in Table 1.

COMPARISON EXAMPLE 2

The procedure of Example 1 was repeated except that a low density polyethylene (density=0.920, MI=20) was used in place of the non-crystalline ethylene-propylene copolymer to give the resuls also shown in Table 1.

COMPARISON EXAMPLE 3

The procedure of Example 1 was repeated except that a styrene-butadiene-styrene block copolymer with styrene/butadiene ratio of 28/72 having a Melt Viscosity of 6 g/10 min. (ASTM D 1238, under condition G) was used in place of the non-crystalline ethylene-propylene copolymer to give the results also shown in Table 1.

TABLE 1

|  | Example 1 | Comparison Example 1 | Comparison Example 2 | Comparison Example 3 |
| --- | --- | --- | --- | --- |
| Flame-retardancy (seconds) (1) | 11 | 30 | 29 | 53 |
| Izod impact strength (Kg · cm/cm notched) (2) | 8.0 | 7.8 | 8.0 | 8.3 |
| Tensile strength (Kg/cm$^2$) (2) | 380 | 385 | 375 | 360 |
| Elongation (%) (2) | 60 | 42 | 38 | 50 |
| Heat distortion temperature (°C.) (2) | 94 | 95 | 94 | 92 |
| Metal insert crack (3) | No crack | Cracks formed | Cracks formed | Cracks formed |
| Colorant loading level (4) | 5 | 10 | 8 | 10 |
| Izod impact strength after coloration (Kg · cm/cm notched) (5) | 6.0 | 4.0 | 4.8 | 6.0 |

Notes:
(1) The sum of periods for combustion of five test pieces with thickness of 3.16 mm according to UL 94;
(2) Measured by JIS K 6871 using injection molded test pieces;
(3) An insert made of brass (diameter = 6 mm, length = 12 mm) of which surface is subjected to knurling was inserted into a boss (tip diameter = 8 mm, root diameter = 9 mm, height = 15 mm) by injection molding. Formation of cracks around insert was observed after dipping the molded product in n-heptane;
(4) The amount of titanium dioxide (parts) required for coloration to MUNSELL COLOR 10 YR 9/1;
(5) Izod impact strength after coloration to MUNSELL COLOR 9/1 by addition of titanium dioxide.

EXAMPLE 2

A blend was prepared by blending in a blender 25 parts of a poly(2,6-dimethyl-1,4-phenylene)ether having a number average molecular weight of 9500, 75 parts of a rubber-reinforced polystyrene containing 12% of polybutadiene rubber, 20 parts of tetrabromobisphenol A, 4 parts of antimony trioxide and 5 parts of a non-crystalline ethylene-propylene copolymer containing 75 mol % of ethylene and 25 mol % of propylene (MI=2.0). The blend was then subjected to melting and kneading in a twin-screw extruder maintained at 200° to 230° C. to give pellets. The resin composition thus prepared was injection molded into test pieces for the measurement of physical properties. The test results are shown in Table 2.

COMPARISON EXAMPLE 4

The procedure of Example 2 was repeated except that the non-crystalline ethylene-propylene copolymer was omitted from the composition to give the results as shown in Table 2.

EXAMPLE 3

A reaction mixture for graft-copolymerization comprising 50 parts of a poly(2,6-dimethyl-1,4-phenylene)ether having a number average molecular weight of 9800, 20 parts of styrene and 1.0 part of di-tert-butyl peroxide was heated to 150° C. over 10 minutes, then to 240° C. over 10 minutes, and the reaction mixture was subjected to extrusion and cutting into pellets. The graft copolymer obtained was found to contain 27% of polystyrene. In 40 ml of methylene chloride was dissolved 2.0 g of this copolymer and the solution was left to stand at 30° C. Even after standing for 6 hours, there was completely no precipitate recognized indicating that there remained substantially no homopolymer of polyphenylene ether.

In a blender, there were blended 30 parts of this graft copolymer, 10 parts of a polystyrene-grafted-polybutadiene containing 40% polybutadiene, 60 parts of a rubber-reinforced polystyrene containing 12% polybutadiene rubber, 13 parts of decabromodiphenylether, 4 parts of antimony trioxide and 4 parts of the non-crystalline ethylene-propylene copolymer as used in Example 2. The resultant blend was molten and kneaded with a twin-screw extruder maintained at 230° C. to 260° C. The physical properties of the resin composition thus prepared are also listed in Table 2.

COMPARISON EXAMPLE 5

The procedure of Example 3 was repeated except that the non-crystalline ethylene-propylene copolymer was omitted from the resin composition to give the results as shown in Table 2.

EXAMPLE 4

Another graft copolymer was prepared according to the same procedure as that in Example 3 except that 50 parts of a poly(2,6-dimethyl-1.4-phenylene)ether and 50 parts of styrene were used. The graft copolymer obtained was found to contain 46% of polystyrene. This copolymer was subjected to the methylene chloride dissolving test similarly to that in Example 3, whereby no homopolymer of polyphenylene ether was detected.

In a blender, there was prepared a blend comprising 60 parts of the above copolymer, 18 parts of a polystyrene-grafted-polybutadiene containing 40% polybutadiene, 22 parts of a rubber-reinforced polystyrene containing 12% polybutadiene rubber, 20 parts of tetrabromobisphenol A, 4 parts of antimony trioxide and 4 parts of a non-crystalline ethylene-propylene copolymer containing ethylidene norbornene as the third component (molar ratio of ethylene/propylene=70/30; Mooney viscosity at 100° C.=40). The physical properties of the resin composition obtained are also listed in Table 2.

TABLE 2

| | Example 2 | Comparison Example 4 | Example 3 | Comparison Example 5 | Example 4 |
|---|---|---|---|---|---|
| Flame-retardancy (seconds) | 11 | 28 | 11 | 27 | 10 |
| Izod impact strength (Kg · cm/cm notched) | 7.0 | 6.7 | 9.6 | 9.0 | 9.1 |
| Tensile strength (Kg/cm²) | 400 | 410 | 395 | 400 | 410 |
| Elongation (%) | 63 | 45 | 61 | 42 | 65 |
| Heat distortion temperature (°C.) | 83 | 83 | 94 | 95 | 88 |
| Colorant loading level | 7 | 13 | 6 | 12 | 8 |
| Metal insert crack | No crack | Cracks formed | No crack | Cracks formed | No crack |

COMPARISON EXAMPLE 6

A sample was obtained in accordance with the procedure of Example 1 except that polystyrene was used in place of the rubber-reinforced polystyrene and the amount of non-crystalline ethylene-propylene copolymer was increased from 4 parts to 8 parts. The composition was brittle showing an Izod impact strength as low as 4 kg-cm/cm notched.

COMPARISON EXAMPLE 7

A sample was obtained in accordance with the procedure of Example 1 except that triphenyl phosphate was used in place of decabromobiphenylether. The resin composition showed poor color tone and the heat distortion temperature thereof was 69° C., an extremely low value.

COMPARISON EXAMPLE 8

A composition obtained in accordance with the procedure of Example 1 except 5 parts of red phosphorus was added in place of decabromobiphenylether and antimony trioxide showed extremely poor color tone; the color tone of MUNSELL COLOR 10 YR 9/1 could not be obtained even at a colorant loading level of 30 and the composition obtained at the colorant loading level of 30 had an Izod impact strength of 2.8 kg-cm/cm notched, an extremely low value.

COMPARISON EXAMPLES 9 AND 10

A composition was obtained in accordance with the procedure of Example 1 except one of the two compounds A and B mentioned below having bonds between atoms of aliphatic carbon and bromine was used in place of decabromobiphenylether. The composition thus obtained showed a quite poor color tone, blackish brown.

compound A: $(CH_2BrCHBrCH_2O)_3P=O$
compound B: $CH_2BrCHBrCHBrCH_2Br$

What we claim is:
1. A resin composition having a nice color tone and high crack-resistance as well as flame-retardancy, consisting essentially of
   (A) 100 weight parts of a resin consisting of (1) a graft-copolymer in which 20–200 weight parts of a vinyl aromatic compound are graft-copolymerized onto 100 weight parts of polyphenylene ether, represented by the formula

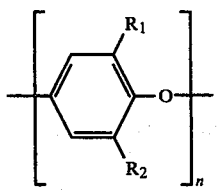

wherein each of $R_1$ and $R_2$ represents a monovalent residue such as the same or different alkyl group having 1 to 4 carbon atoms, aryl group, halogen and hydrogen, and n represents polymerization degree of about 50 to about 250 and (2) rubber-reinforced vinyl aromatic polymer, said polyphenylene ether content being 5–70 wt. % (based on the weight of the resin part), (B) 1–30 weight parts of a halogenated aromatic compound and (C) 0.5–20 weight parts of a non-crystalline ethylene-propylene copolymer.

2. The resin composition according to claim 1 wherein each of $R_1$ and $R_2$ is methyl group.

3. The resin composition according to claim 1 wherein the rubber-reinforced vinyl aromatic polymer is a rubber-reinforced polystyrene.

4. The resin composition according to claim 1 wherein the rubber for the rubber-reinforced vinyl aromatic polymer is polybutadiene, butadiene-styrene copolymer, natural rubber, or butadiene-acrylonitrile copolymer.

5. The resin composition according to claim 4 wherein the rubber is polybutadiene.

6. The resin composition according to claim 4 wherein the rubber is butadiene-styrene copolymer.

* * * * *